(12) United States Patent
Chou

(10) Patent No.: US 9,071,727 B2
(45) Date of Patent: Jun. 30, 2015

(54) VIDEO BANDWIDTH OPTIMIZATION

(75) Inventor: Jim Chou, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 417 days.

(21) Appl. No.: 13/311,345

(22) Filed: Dec. 5, 2011

(65) Prior Publication Data

US 2013/0141518 A1  Jun. 6, 2013

(51) Int. Cl.
*H04N 7/14* (2006.01)

(52) U.S. Cl.
CPC .................... *H04N 7/148* (2013.01)

(58) Field of Classification Search
USPC ............... 348/14.01–14.16; 370/260–261; 709/204
See application file for complete search history.

(56) References Cited

U.S. PATENT DOCUMENTS

| | | | | |
|---|---|---|---|---|
| 5,914,747 | A * | 6/1999 | Hamilton | 348/14.08 |
| 8,462,191 | B2 * | 6/2013 | DeGrazia et al. | 348/14.01 |
| 2002/0125993 | A1 * | 9/2002 | Gutta et al. | 340/5.52 |
| 2006/0031291 | A1 * | 2/2006 | Beckemeyer | 709/204 |
| 2008/0240237 | A1 | 10/2008 | Tian et al. | |
| 2008/0240571 | A1 | 10/2008 | Tian et al. | |
| 2010/0171808 | A1 | 7/2010 | Harrell et al. | |
| 2010/0208078 | A1 | 8/2010 | Tian et al. | |
| 2011/0153738 | A1 * | 6/2011 | Bedingfield | 709/204 |
| 2012/0206559 | A1 * | 8/2012 | Lin et al. | 348/14.08 |
| 2012/0293606 | A1 * | 11/2012 | Watson et al. | 348/14.16 |
| 2012/0327176 | A1 * | 12/2012 | Kee | 348/14.08 |

* cited by examiner

*Primary Examiner* — Melur Ramakrishnaiah
(74) *Attorney, Agent, or Firm* — Cindy Kaplan

(57) ABSTRACT

In one embodiment, a method includes receiving at a network device, video from a first endpoint, analyzing the video received from the first endpoint, processing video received from a second endpoint based on the analyzed video to optimize bandwidth between the network device and the first endpoint, and transmitting the processed video to the first endpoint. An apparatus is also disclosed.

20 Claims, 7 Drawing Sheets

VIDEO BANDWIDTH OPTIMIZATION

TECHNICAL FIELD

The present disclosure relates generally to communication networks, and more particularly, to optimizing video bandwidth in a network.

BACKGROUND

Video communications over networks have been rapidly growing and are expected to continue to grow. Consumer and business Internet traffic is using more media applications. Video conferencing has become popular as a way to reduce travel expenses and enhance collaboration. For network conditions in which bandwidth is limited, video bandwidth optimization is desired to improve video quality.

BRIEF DESCRIPTION OF THE FIGURES

Corresponding reference characters indicate corresponding parts throughout the several views of the drawings.

DESCRIPTION OF EXAMPLE EMBODIMENTS

Overview

In one embodiment, a method generally comprises receiving at a network device, video from a first endpoint, analyzing the video received from the first endpoint, processing video received from a second endpoint based on the analyzed video to optimize bandwidth between the network device and the first endpoint, and transmitting the processed video to the first endpoint.

In another embodiment, an apparatus generally comprises a video analyzer for analyzing video received from a first endpoint, and a processor for processing video received from a second endpoint based on the analyzed video to optimize bandwidth between the apparatus and the first endpoint, and transmitting the processed video to the first endpoint.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In many networks, video applications consume a significant portion of network bandwidth. For network conditions in which bandwidth is limited, methods for reducing video bandwidth may provide an improvement to video quality for all endpoints involved. Embodiments described herein provide a method and apparatus for reducing video bandwidth based on video analytics in conjunction with adaptive encoding. In one embodiment, video analytics such as face detection and eye gaze detection may be used with adaptive bit-rate codecs to achieve video bandwidth optimization in a video conference setting.

Figure 1:
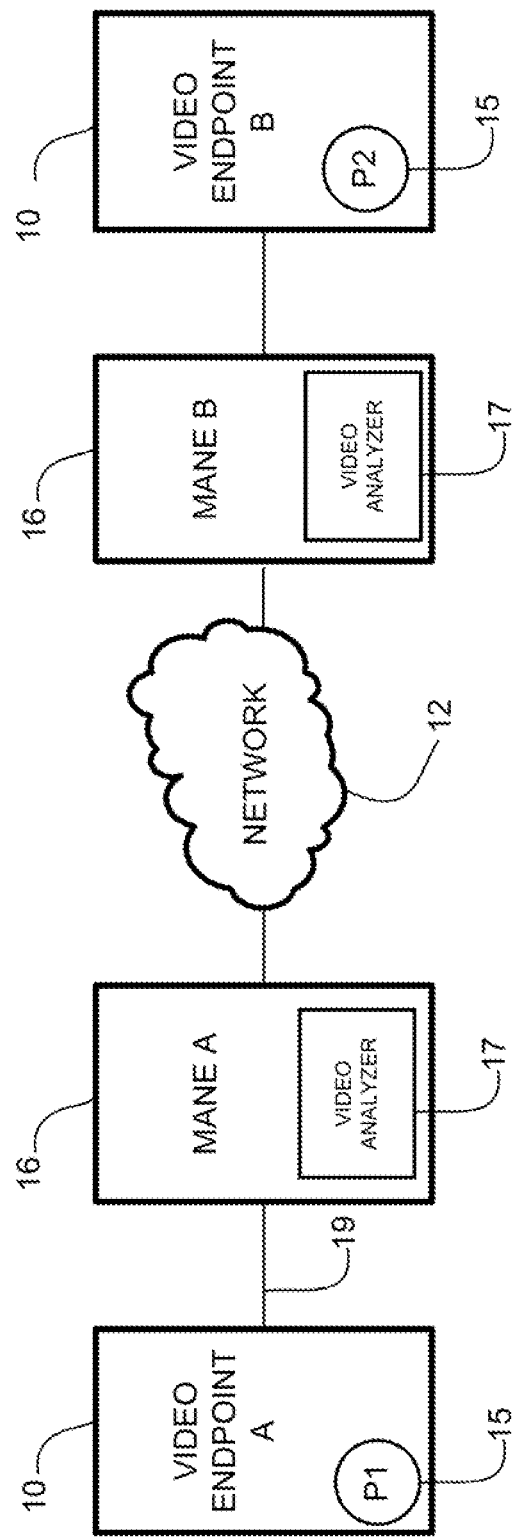
FIG. 1 illustrates an example of a network in which embodiments described herein may be implemented.

Referring now to the figures, and first to FIG. 1, an example of a network in which embodiments described herein may be implemented is shown. The network includes a communication system comprising endpoints A, B (e.g., video sources/receivers) 10 in communication over network 12. The network 12 may include one or more networks (e.g., local area network, metropolitan area network, wide area network, enterprise network, Internet, intranet, radio access network, public switched network, or any other network). The endpoints 10 are connected via communication links. Media flow paths between the endpoints 10 may include any number or type of intermediate nodes (e.g., routers, switches, gateways, or other network devices), which facilitate passage of data between the endpoints.

The endpoints 10 are configured to originate or terminate communications over the network. The endpoints 10 may comprise any device or combination of devices configured for receiving, transmitting, or receiving and transmitting media flows. Media may include, for example, video, images, graphics, text, audio, or other data or combination of data. The endpoint 10 may comprise, for example, a personal computer, personal digital assistant (PDA), VoIP phone, tablet, cellular telephone, telepresence device, media center device, or any other network device capable of engaging in video exchanges over the network 12. Each endpoint 10 may include one or more cameras, monitors, speakers, microphones, processors, network interfaces, etc. For simplification, only two endpoints 10 are shown in FIG. 1, however, the communication system may include any number of endpoints 10.

Any number of participants (e.g., 0, 1, 2, 3, ...) may be located at each video endpoint 10. Participant (P1, P2) 15 represents one or more individuals or groups of individuals who are present for a video session.

The term 'video session' as used herein refers to any type of meeting, video conference, telepresence session, broadcast, telecast, or any other communication session transmitted using any video means. The video may be encrypted, compressed, or encoded according to any format.

The communication system shown in FIG. 1 further includes network devices (e.g., Media Aware Network Elements (MANEs) A, B) 16 interposed between the endpoints 10 and operable to process a media stream. The MANE 16 may be located at a network appliance, server, router, switch, gateway, bridge, or any other network device. The MANE 16 may be inserted at an edge of a network that includes one or more video endpoints 10. For example, the MANE 16 may be located at an edge of an organization's local area network (LAN), which includes one or more of the video endpoints 10. The MANE 16 may also be located at an edge of a service provider network or at a gateway between networks, for example. One of the MANEs 16 may process video signals from one or more senders and the other MANE may further process the media stream before forwarding it to one or more receivers. There may also be only one MANE 16 located between endpoints 10. The video endpoints 10 may be configured to send media streams to more than one network, and MANEs 16 may be located at one or more of the networks. One or more endpoints may send media streams to the MANE 16. The MANE 16 may forward compressed, processed media streams to one or more receivers.

One or more of the MANEs 16 include a video analyzer 17, which is used to analyze video received from a transmitting endpoint 10. In the example shown in FIG. 1, a video analyzer 17 is located at each MANE 16. As described in detail below, the video analyzer 17 detects an attribute of one or more participants 15 at the endpoint 10. For example, the attribute may comprise the presence or lack of presence of participants 15 at the endpoint 10, or the eye gaze of one or more participants for use in identifying a viewed portion of a video.

In one example, the two video endpoints (A, B) 10 are participating in a video conference and the MANEs (A, B) 16 are each located at the edge of the network in which the respective video endpoints are located. Video endpoint A (local or first endpoint) transmits video to video endpoint B (remote or second endpoint) in a video session. MANE A receives the video stream from video endpoint A and analyzes the video (e.g., performs face detection or eye gaze detection on the incoming video stream). MANE A identifies one or more attributes associated with participant P1 at video endpoint A based on the analyzed video and uses this information to process video transmitted from video endpoint B and received at MANE A before transmitting the video to endpoint A. In this example, the video bandwidth is optimized on link 19 between MANE A and video endpoint A (referred to as 'last-mile'). As noted above, there may be any number of endpoints 10 in a video session. Thus, the analyzed video may be used to process video received from more than one endpoint 10.

The MANE 16 optimizing video bandwidth for the transmitting endpoint 10 may be located anywhere along the media path between the endpoints. For example, bandwidth optimization for video endpoint A may be performed at MANE A to reduce the video bandwidth between MANE A and endpoint A (as described above), or may be performed at remote MANE B to reduce the video bandwidth over network 12.

The terms 'local' and 'remote' or 'first' and 'second' are used herein to identify different endpoints in a video session. The endpoints 10 may be located any distance apart from one another and each endpoint may operate as a local or remote endpoint (or first or second endpoint).

It is to be understood that the network shown in FIG. 1 and described above is only an example and that the embodiments may be implemented in networks having different network topologies or network devices, without departing from the scope of the embodiments.

Figure 2:
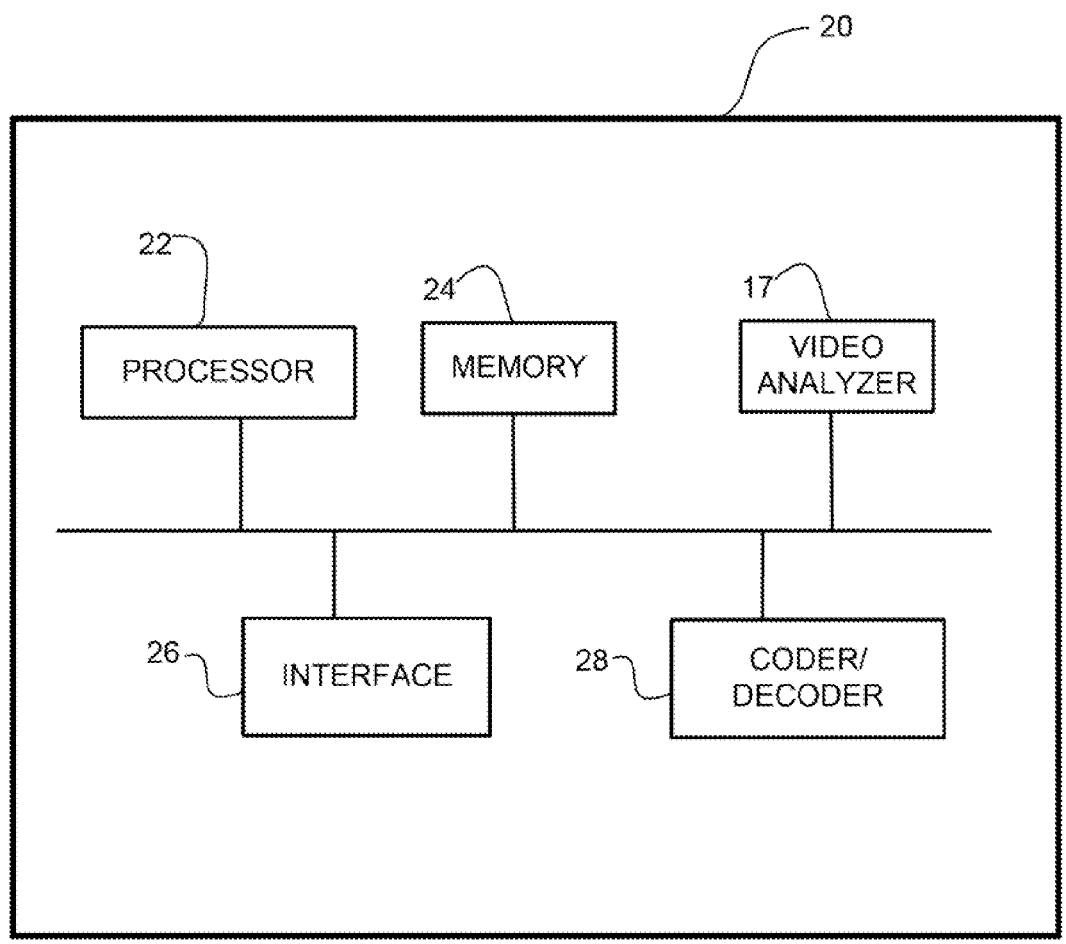
FIG. 2 depicts an example of a network device useful in implementing embodiments described herein.

FIG. 2 is a block diagram illustrating an example of a network device (e.g., media aware network element) 20 that may be used to implement embodiments described herein. The network device 20 is a programmable machine that may be implemented in hardware, software, or any combination thereof. The network device 20 includes a processor 22, memory 24, interface 26, coder/decoder subsystem 28, and video analyzer 17.

Memory 24 may be a volatile memory or non-volatile storage, which stores various applications, modules, and data for execution and use by the processor 22.

Logic may be encoded in one or more tangible computer readable media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The interface 26 may comprise any number of interfaces (linecards, ports) for receiving signals or data or transmitting signals or data to other devices. The interface 26 may include, for example, an Ethernet interface for connection to a computer or network.

The coder/decoder subsystem 28 may include, for example, a video codec configured to accept video signals and compress the video for transmission to the network 12 or other endpoints 10. As described below, the subsystem 28 may include a bit-rate encoder or scalable video codec for use in adaptive bit-rate encoding.

The network device 20 may further include any suitable combination of hardware, software, algorithms, processors, DSPs (digital signal processors), devices, components, or elements operable to facilitate the capabilities described herein. It is to be understood that the network device 20 shown in FIG. 2 and described above is only one example and that different components and configurations may be used, without departing from the scope of the embodiments.

Figure 3:
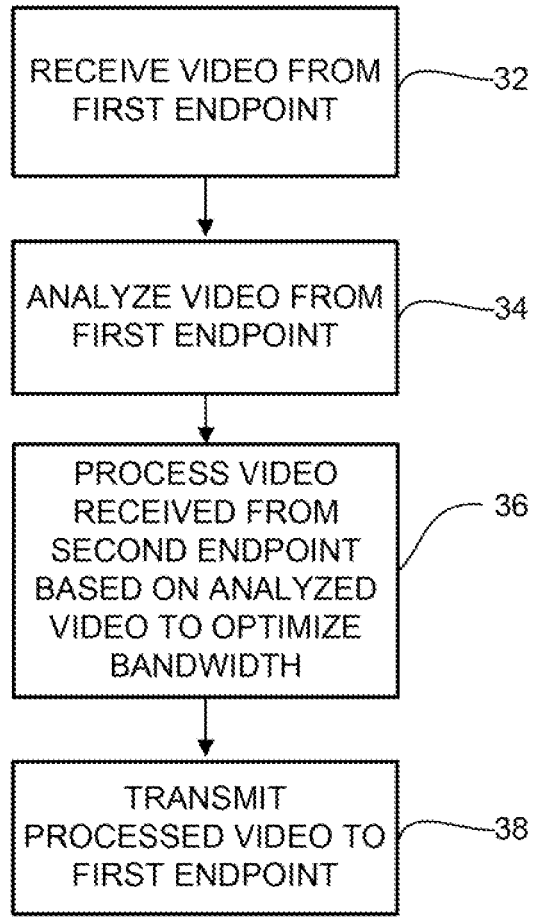
FIG. 3 is a flowchart illustrating an overview of a process for video bandwidth optimization, in accordance with one embodiment.

FIG. 3 is a flowchart illustrating an overview of a process for video bandwidth optimization, in accordance with one embodiment. At step 32, a network device (e.g., media aware network element 16 in FIG. 1) receives video from a first endpoint 10 (e.g., video endpoint A). The network device 16 analyzes the video received from the first endpoint (step 34). The network device 16 may also transmit the video in a video session to one or more remote endpoints (e.g., second video endpoint B). The network device 16 receives video from the second endpoint and processes the video based on the analyzed video to optimize bandwidth between the network device and the first endpoint (step 36). The network device 16 transmits the processed video to the first endpoint (step 3S).

Figure 4:
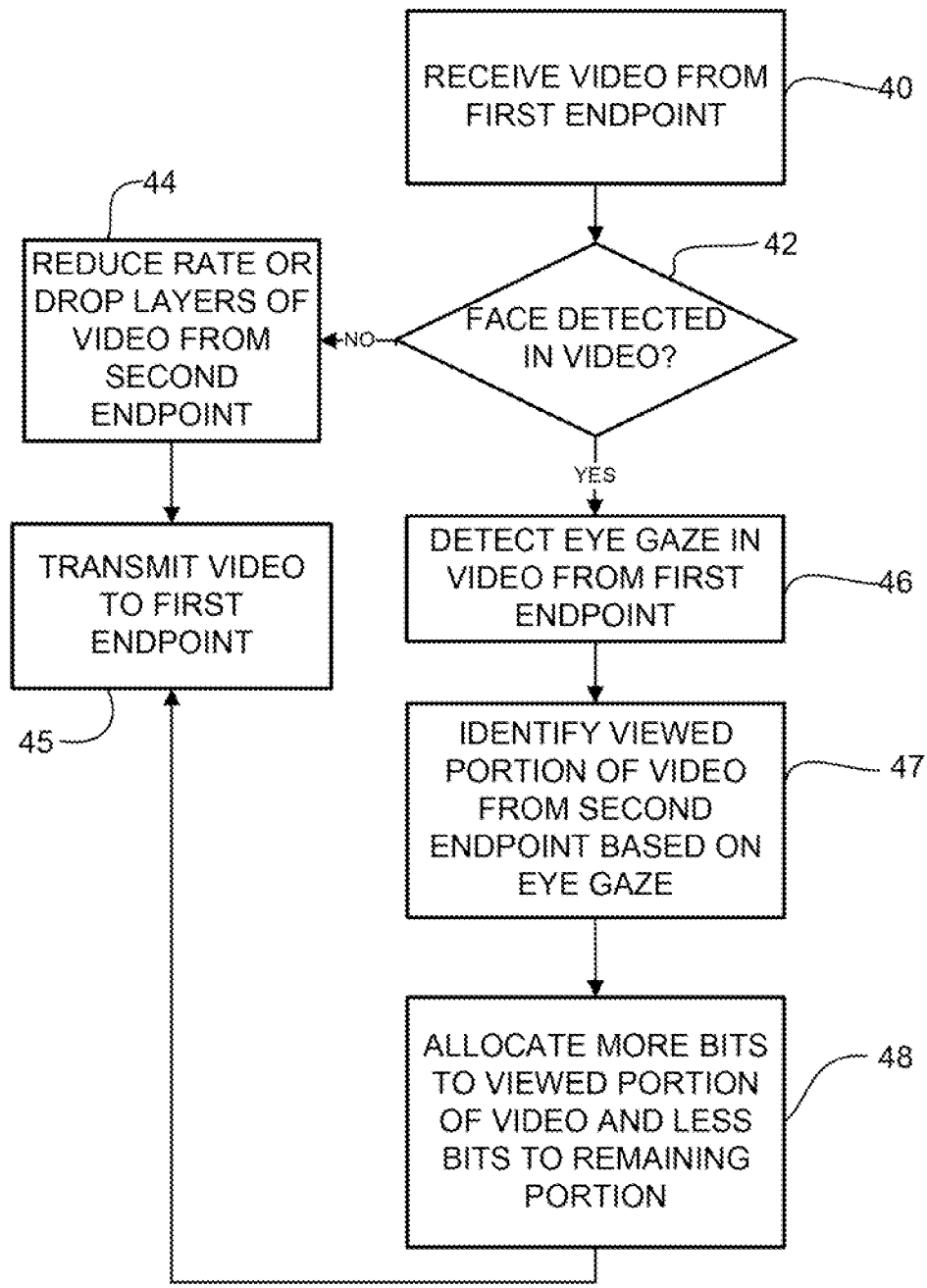
FIG. 4 is a flowchart illustrating a process for face detection and eye gaze detection for use in bandwidth optimization, in accordance with one embodiment.

FIG. 4 illustrates details of a process for analyzing video (step 34 in FIG. 3) and processing video (step 36 in FIG. 3), in accordance with one embodiment. At step 40, the network device 16 receives video from a first video endpoint (e.g., endpoint A in FIG. 1). A face detector is used to determine if there is at least one participant present at the endpoint transmitting the video (step 42). If no participant is detected (e.g., participant needed to step out or leave the video conference temporarily), video received from a second endpoint (e.g., endpoint B in FIG. 1) is processed to reduce video bandwidth (step 44). As described below, the network device 16 may reduce the rate of the video or drop layers from the video. The video is then transmitted to the first endpoint (step 45). Since there is no participant present at the endpoint receiving the video, the quality of the video can be reduced temporarily.

If one or more participants P1 are detected at endpoint A, the network device 16 detects the eye gaze of the participants for use in identifying a portion of the video received from the second endpoint (endpoint B) that is being viewed at endpoint A (steps 46 and 47). The network device 16 allocates more bits to the viewed portion of the video from endpoint B and less bits to the remaining portion of the video, to optimize video bandwidth (step 48). This may provide a bandwidth reduction based on the fewer bits allocated to the remaining portion of the video or provide higher quality video for the viewed portion. The video is transmitted to the first endpoint at step 45.

It is to be understood that the processes shown in FIGS. 3 and 4 and described above are only examples and that steps may be removed, added, reordered, or combined, without departing from the scope of the embodiments. For example, the system may be configured to use only face detection or only eye gaze detection. The system may also be configurable by a user or administrator to manually turn on or off one or more features (e.g., face detection, eye gaze detection) or configure the type or amount of adjustment that is made to the video (e.g., percent of video rate reduction).

Figure 5:
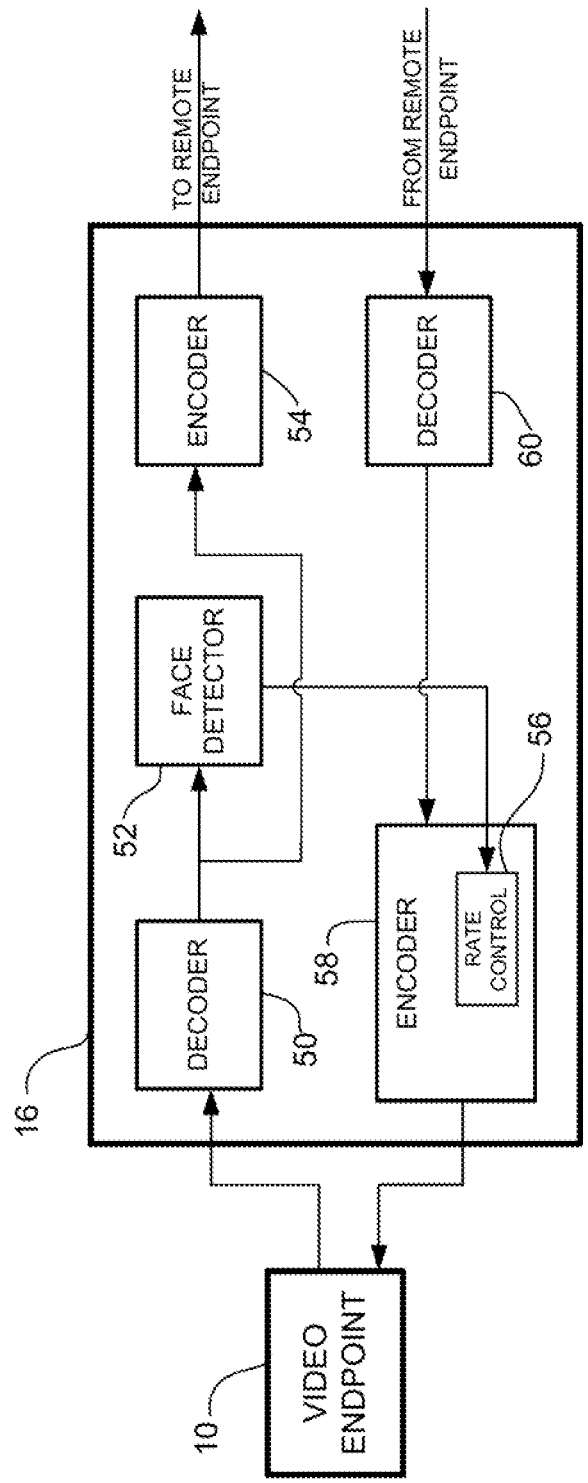
FIG. 5 illustrates an example of face detection used with an adaptive bit-rate encoder for bandwidth optimization.

FIG. 5 illustrates one example of face detection used with adaptive bit-rate codec for bandwidth optimization. The transmitting video endpoint 10 transmits a video stream to MANE 16. The video stream is processed by decoder 50. Output from decoder 50 is transmitted to face detector 52 and encoder 54. The encoder 54 transmits the video stream to one or more remote endpoints in the video session. The face detector 52 determines if at least one participant is present at the transmitting video endpoint 10. This information is input to a rate controller 56 located at encoder 58. Video received from the remote endpoint is decoded by decoder 60 at the MANE 116 and sent to the encoder 58 if the face detector 52 determines that no participant is present at the transmitting video endpoint 10, the rate controller 56 decreases the rate of the video stream sent to the endpoint to reduce video bandwidth over the network. The rate controller 56 preferably takes into account average network rate when adjusting the rate. As noted above, the video rate reduction may be performed at either of the MANEs 16 shown in FIG. 1.

Figure 6:
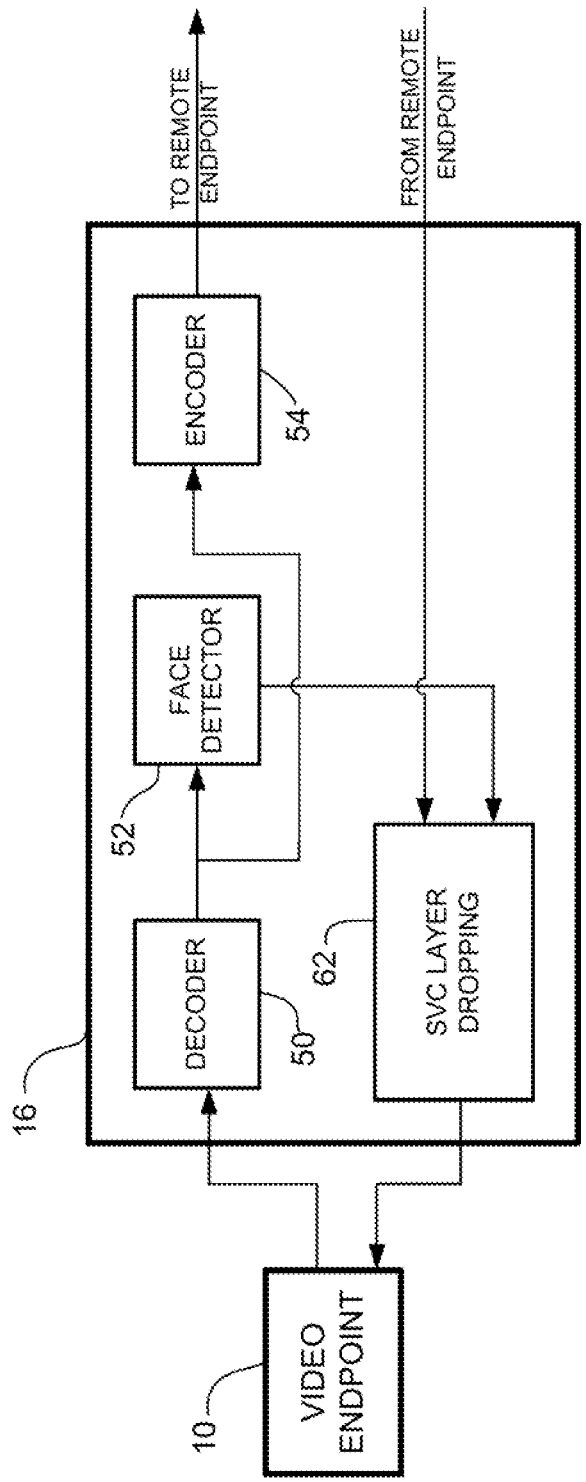
FIG. 6 illustrates an example of face detection used with scalable video coding layer dropping for bandwidth optimization.

FIG. 6 illustrates another embodiment for face detection in which scalable video coding (SVC) layer dropping is used for bandwidth reduction. In this embodiment, the bitstream transmitted from the remote video endpoint is encoded in a scalable video codec format. SVC provides a subset video bitstream derived by dropping layers from a larger video to reduce the bandwidth required for the subset bitstream. The system shown in FIG. 6 includes the decoder 50, face detector 52, and encoder 54, as described above with respect to FIG. 5. If no participant is detected at the transmitting endpoint 10 by face detector 52, layers may be dropped by SVC layer dropping module (logic) 62 to reduce the bit-rate of the media stream.

Figure 7:
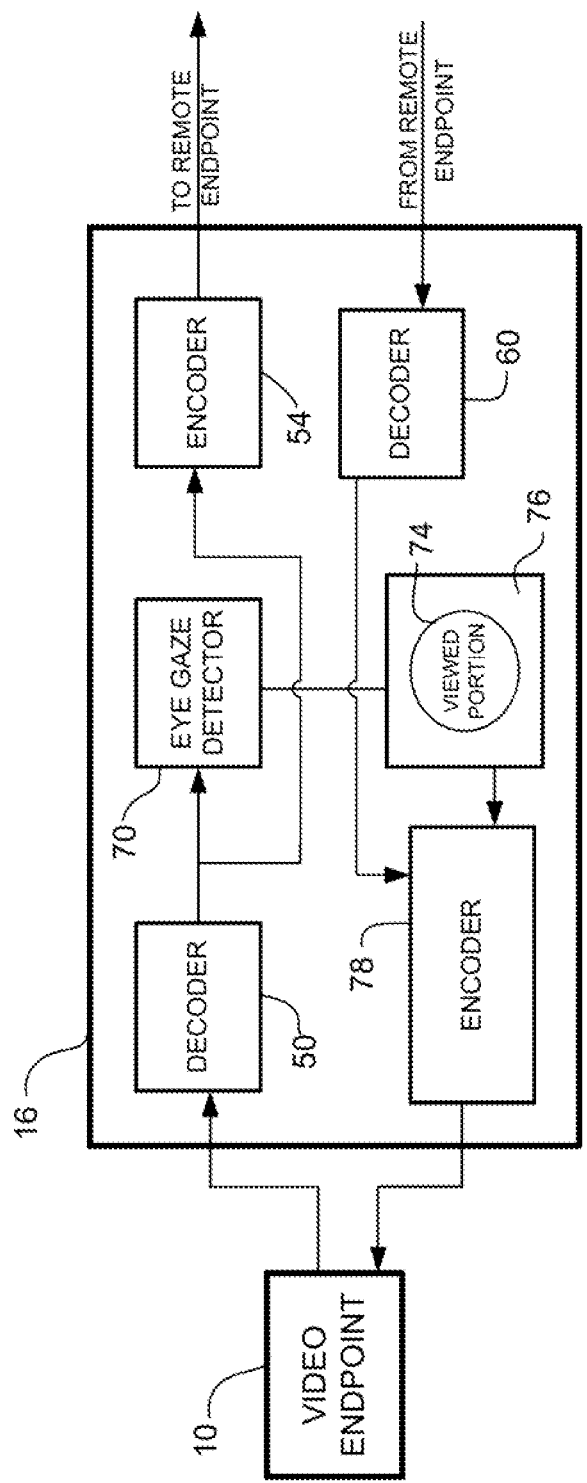
FIG. 7 illustrates an example of eye gaze detection used with a rate adaptive encoder for bandwidth optimization.

FIG. 7 illustrates eye gaze detection used with a rate adaptive encoder for bandwidth optimization. The system shown in FIG. 7 includes decoders 50, 60, and encoder 54, as described above with respect to FIG. 5. Output from the decoder 50 is fed to an eye gaze detector 70. The eye gaze detector 70 identifies a viewed portion 74 within an image transmitted from the remote endpoint based on the eye gaze of one or more participants at the transmitting video endpoint 10. Encoder 78 allocates more bits to the viewed portion 74 of the video and fewer bits to the remaining portion 76 that is not in the viewing area. A filter may be used to smooth out the transition between the viewed portion 74 and remaining portion 76 to improve video quality.

As previously described, the bandwidth optimization system may be configured for face detection, eye gaze detection, or both. Therefore, the network device 16 may include a combination of components shown in FIGS. 5 and 7 or FIGS. 6 and 7, for example.

The face detector 52 may be any type of module, logic, or device configured to identify whether or not a person is present in a video image. Many face detection methods are known by those skilled in the art and may be used. For example, face detection may include eye detection or fitting elliptical shapes to edges detected corresponding to a face. Examples of face detection are described in commonly assigned U.S. Patent Application Publication No. 2008/0240237, filed Jan. 28, 2008 and titled "Real-Time Face Detection", and U.S. Patent Application Publication No. 2008/0240571, filed Feb. 14, 2008 and titled "Real-Time Face Detection Using Temporal Differences", both of which are incorporated by reference herein, though other face or people detection algorithms known by those skilled in the art are contemplated to be within the scope of the embodiments.

The eye gaze detector 70 may be any type of module, logic, or device configured to identify a direction of eye gaze of one or more participants 15 in a video image. The participants 15 may look at a particular target, such as a video screen (in a conference room with multiple screens) or a specific portion of a video screen (in a conference room with one or more screens). In one embodiment, the eye gaze of the participant is determined from a video signal generated from viewing the person with at least one video camera. From the video signal, a head region of the person may be detected and tracked. The dimension and location of a sub-region within the head region may also be detected and tracked from the video signal. An estimate of the eye gaze of the person is then computed from a relative position of the sub-region within the head region. Many eye gaze detection methods are known by those skilled in the art and may be used. Examples of eye gaze detection are described in commonly assigned U.S. Patent Application Publication No. 2010/0208078, filed Feb. 17, 2009 and titled "Horizontal Gaze Estimation for Video-Conferencing", and U.S. Patent Application Publication No. 2010/0171808, filed Mar. 15, 2010 and titled "System and Method for Enhancing Eye Gaze in a Telepresence System", both of which are incorporated by reference herein, though other eye gaze detection methods known by those skilled in the art are contemplated to be within the scope of the embodiments.

If there is more than one participant 15 at the endpoint 10, the eye gaze detector 70 may identify a viewed portion of the video for each participant and identify an overlapping portion of the multiple targets in the video as the viewed area. Also, if there are two or more remote endpoints transmitting video to the local endpoint, the eye gaze detector 70 may be used to identify the video being viewed by the participants at the local endpoint (e.g., identify a video screen associated with one of the remote endpoints). The encoder 78 can then reduce the rate of the video stream from the remote endpoint associated with the video that is not being viewed.

The processing performed in response to the video analytics is preferably updated periodically while preventing multiple rate changes within a specified time period. For example, the optimization may be updated every second (e.g., every 30 frames for a 30 frame/second system).

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving at a network device, video from a first endpoint;
   analyzing the video received from said first endpoint;
   processing video received from a second endpoint based on said analyzed video to optimize bandwidth between the network device and said first endpoint; and transmitting said processed video to said first endpoint;
wherein the network device is located at an edge of a network comprising said first endpoint.

2. The method of claim 1 wherein analyzing the video comprises determining if a participant is present at said first endpoint.

3. The method of claim 2 and wherein processing the video received from said second endpoint comprises decreasing a rate of the video if no participant is present at said first endpoint.

4. The method of claim 2 wherein processing the video received from said second endpoint comprises performing scalable video coding layer dropping if no participant is present at said first endpoint.

5. The method of claim 1 wherein analyzing the video comprises detecting eye gaze of one or more participants at said first endpoint.

6. The method of claim 5 wherein processing the video received from said second endpoint comprises identifying a viewed portion of the video based on said eye gaze and allocating more bits to said viewed portion than a remaining portion of the video.

7. The method of claim 1 wherein the network device comprises a media aware network element.

8. The method of claim 1 wherein said second endpoint comprises a plurality of endpoints.

9. The method of claim 1 further comprising transmitting the video received from said first endpoint to said second endpoint in a video session.

10. An apparatus comprising:
a video analyzer for analyzing video received from a first endpoint; and
a processor for processing video received from a second endpoint based on said analyzed video to optimize bandwidth between the apparatus and said first endpoint, and transmitting said processed video to said first endpoint;
wherein processing comprises allocating more bits to a first portion of the video than a remaining portion of the video.

11. The apparatus of claim 10 wherein the video analyzer comprises a face detector.

12. The apparatus of claim 10 wherein analyzing the video comprises determining if a participant is present at said first endpoint.

13. The apparatus of claim 12 wherein the processor comprises a bit-rate encoder for decreasing a rate of the video if no participant is present at said first endpoint.

14. The apparatus of claim 12 wherein the processor comprises a scalable video codec for dropping layers of the video if no participant is present at said first endpoint.

15. The apparatus of claim 10 wherein the video analyzer comprises an eye gaze detector for detecting eye gaze of one or more participants at said first endpoint.

16. The apparatus of claim 15 wherein processing the video received from said second endpoint comprises identifying a viewed portion of the video based on said eye gaze, said first portion of the video comprising said viewed portion.

17. The apparatus of claim 10 wherein the apparatus comprises a media aware network element.

18. The apparatus of claim 10 wherein the apparatus is configured for transmitting the video received from said first endpoint to said second endpoint in a video session.

19. The apparatus of claim 18 further comprising a decoder for decoding the video received from said first endpoint before analyzing the video and an encoder for encoding the video before transmitting the video to said second endpoint.

20. Logic encoded on one or more non-transitory computer readable media for execution and when executed operable to:
analyze video received from a first endpoint to detect eye gaze of one or more participants at said first endpoint and identify a viewed portion of the video;
process video received from a second endpoint based on said analyzed video to allocate more bits to said viewed portion than a remaining portion of the video; and
transmit said processed video to said first endpoint.

* * * * *